US009444513B2

(12) United States Patent
Yu (10) Patent No.: US 9,444,513 B2
(45) Date of Patent: Sep. 13, 2016

(54) COMMUNICATION METHOD AND DEVICE FOR DYNAMIC ADJUSTMENT OF DOWNLINK-UPLINK SUBFRAME CONFIGURATION IN A TIME DIVISION DUPLEX SYSTEM

(71) Applicant: Huawei Technologies Co., Ltd., Shenzhen, Guangdong (CN)

(72) Inventor: Zheng Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 333 days.

(21) Appl. No.: 14/021,908

(22) Filed: Sep. 9, 2013

(65) Prior Publication Data

US 2014/0056185 A1 Feb. 27, 2014

Related U.S. Application Data

(63) Continuation of application No. PCT/CN2012/072171, filed on Mar. 12, 2012.

(30) Foreign Application Priority Data

Mar. 11, 2011 (CN) .......................... 2011 1 0059168

(51) Int. Cl.
*H04J 3/00* (2006.01)
*H04B 1/56* (2006.01)
*H04W 28/18* (2009.01)

(52) U.S. Cl.
CPC ............... *H04B 1/56* (2013.01); *H04W 28/18* (2013.01)

(58) Field of Classification Search
CPC ................................ H04W 28/18; H04B 1/56
See application file for complete search history.

(56) References Cited

U.S. PATENT DOCUMENTS

2009/0181690 A1* 7/2009 McCoy ................. H04L 5/0007
455/452.1
2009/0201838 A1* 8/2009 Zhang .................. H04B 7/2656
370/280

(Continued)

FOREIGN PATENT DOCUMENTS

| CN | 101262322 A | 9/2008 |
| CN | 101651895 A | 2/2010 |
| CN | 101926214 A | 12/2010 |

(Continued)

OTHER PUBLICATIONS

Written Opinion of the International Searching Authority in corresponding PCT Patent Application No. PCT/CN2012/072171 (Jun. 21, 2012).

(Continued)

*Primary Examiner* — Abdelnabi Musa
(74) *Attorney, Agent, or Firm* — Leydig, Voit & Mayer, Ltd.

(57) ABSTRACT

Embodiments of the present invention, relating to the field of communications technologies, provide a communication method and device used for a time division duplex system. The communication method includes: adjusting a first uplink-downlink subframe configuration to a second uplink-downlink subframe configuration, where there is an intersection between subframes corresponding to the second uplink-downlink subframe configuration and subframes corresponding to the first uplink-downlink subframe configuration, where the intersection is a set of subframes having a same subframe index and a same subframe type, and the intersection includes at least one uplink subframe and at least one downlink subframe; and communicating, by the user equipment, according to a timing relationship same as a timing relationship corresponding to the first uplink-downlink subframe configuration, with the base station in the at least one uplink subframe and the at least one downlink subframe comprised in the intersection.

18 Claims, 3 Drawing Sheets

(56) References Cited

U.S. PATENT DOCUMENTS

| | | | |
|---|---|---|---|
| 2009/0249153 A1 | 10/2009 | Zhang | |
| 2010/0165939 A1* | 7/2010 | Lin | H04L 5/0053 370/329 |
| 2010/0246456 A1* | 9/2010 | Suo | H04W 56/003 370/280 |
| 2014/0036738 A1* | 2/2014 | Kim | H04J 3/1694 370/280 |

FOREIGN PATENT DOCUMENTS

| WO | WO 2009120701 A2 | 10/2009 |
|---|---|---|
| WO | WO 2010049587 A1 | 5/2010 |
| WO | WO 2010129295 A1 | 11/2010 |

OTHER PUBLICATIONS

International Search Report in corresponding PCT Patent Application No. PCT/CN2012/072171 (Jun. 21, 2012).

* cited by examiner

| 0 | 1 | 2 | 3 | 4 | 5 | 6 | 7 | 8 | 9 |
|---|---|---|---|---|---|---|---|---|---|
| D | S | U | U | U | D | S | U | U | D |

COMMUNICATION METHOD AND DEVICE FOR DYNAMIC ADJUSTMENT OF DOWNLINK-UPLINK SUBFRAME CONFIGURATION IN A TIME DIVISION DUPLEX SYSTEM

CROSS-REFERENCE TO RELATED APPLICATIONS

This application is a continuation of International Patent Application No. PCT/CN2012/072171, filed on Mar. 12, 2012, which claims priority to Chinese Patent Application No. 201110059168.6, filed on Mar. 11, 2011, both of which are hereby incorporated by reference in their entireties.

FIELD OF TECHNOLOGY

The present invention relates to the field of communications technologies, and in particular, to a communication method and device used for a time division duplex (time division duplex, TDD) system.

BACKGROUND

In a wireless communication system, a base station sends data and control information to a user equipment UE (User Equipment) in a downlink, and receives data and control information from the user equipment in an uplink. Similarly, the user equipment transfers data and control information to the base station in the uplink, and receives data and control information from the base station in the downlink. The base station can communicate with the UE in TDD mode. In a TDD wireless communication system, downlink transmission and uplink transmission use a same carrier, but are conducted in different time slots (or subframes). That is to say, the downlink transmission and the uplink transmission are conducted in time division multiplexing mode. An advantage of the TDD is that an uplink subframe and a downlink subframe can be configured flexibly, so that the system accommodates service change requirements of uplink-downlink data transmission. For example, with the increase of uplink data amount, the base station can allocate more time slot resources to the uplink; with the decrease of uplink data amount, the base station can reduce the time slot resources used by the uplink.

In the TDD wireless communication system of long term evolution LTE (Long Term Evolution)/long term evolution-advanced LTE-A (LTE Advanced), each radio frame includes 10 subframes. Basing on service applications of a subframe, the subframe may be a downlink subframe, an uplink subframe or a special subframe. The base station notifies the uplink-downlink subframe configuration to the UE in a system message; after obtaining the uplink-downlink subframe configuration, the UE obtains a type of each of the subframes within each radio frame.

To improve the performance and flexibility of the LTE/LTE-A TDD system, the base station adjusts the uplink-downlink subframe configuration of the system dynamically. For UEs that can only determine the uplink-downlink subframe configuration according to the system message, for example, UEs in LTE Version 8/9/10 (Release 8/9/10), the system message is semi-statically updated, and the update period of the system message is long. Therefore, if a dynamic adjustment is conducted by the base station in the uplink-downlink subframe configuration, the UEs cannot obtain, in real-time, the uplink-downlink subframe configuration that is dynamically adjusted by the base station, and will receive and transmit data according to the uplink-downlink subframe configuration determined from the system message. Consequently, the dynamic adjustment conducted by the base station in the uplink-downlink subframe configuration may result that the UE cannot communicate with the base station normally.

SUMMARY

Embodiments of the present invention provide a communication method and device used for a TDD system, which are capable of effectively ensuring normal communication between a UE and a base station.

Embodiments of the present invention adopt the following technical solutions:

A communication method used for a TDD system, includes:

adjusting, by a base station, a first uplink-downlink subframe configuration to a second uplink-downlink subframe configuration, where an intersection between subframes corresponding to the second uplink-downlink subframe configuration and subframes corresponding to the first uplink-downlink subframe configuration, where the intersection is a set of subframes having a same subframe index and a same subframe type, and the intersection includes at least one uplink subframe and at least one downlink subframe; and communicating, by the base station, with a UE, according to a timing relationship same as a timing relationship corresponding to the first uplink-downlink subframe configuration in the at least one uplink subframe and the at least one downlink subframe included in the intersection.

A communication method used for a TDD system, includes:

communicating, by a UE, with a base station according to a first uplink-downlink subframe configuration; and, after the first uplink-downlink subframe configuration is adjusted to a second uplink-downlink subframe configuration, communicating, by the UE, according to a timing relationship same as a timing relationship corresponding to the first uplink-downlink subframe configuration, with the base station in subframes included in an intersection between subframes corresponding to the second uplink-downlink subframe configuration and subframes corresponding to the first uplink-downlink subframe configuration, where the intersection is a set of subframes having a same subframe index and a same subframe type, and the intersection includes at least one uplink subframe and at least one downlink subframe.

A base station, includes:

a configuration adjusting unit, configured to adjust the first uplink-downlink subframe configuration to a second uplink-downlink subframe configuration, where an intersection between subframes corresponding to the second uplink-downlink subframe configuration and subframes corresponding to the first uplink-downlink subframe configuration, where the intersection is a set of subframes having a same subframe index and a same subframe type, and the intersection includes at least one uplink subframe and at least one downlink subframe; and a communicating unit, configured to communicate with a UE, according to a timing relationship same as a timing relationship corresponding to the first uplink-downlink subframe configuration, in the at least one uplink subframe and the at least one downlink subframe included in the intersection.

A UE, includes:

a configuration determining unit, configured to obtain a first uplink-downlink subframe configuration; and a communicating unit, configured to communicate, after the first uplink-downlink subframe configuration is adjusted to a second uplink-downlink subframe configuration, according to a timing relationship same as a timing relationship corresponding to the first uplink-downlink subframe configuration, with the base station in subframes comprised in an intersection between subframes corresponding to the second uplink-downlink subframe configuration and subframes corresponding to the first uplink-downlink subframe configuration, where the intersection is a set of subframes having a same subframe index and a same subframe type, and the intersection includes at least one uplink subframe and at least one downlink subframe.

With the above technical solutions, in one aspect, the communication method and device used for a TDD system provided in embodiments of the present invention are capable of dynamically adjusting the uplink-downlink subframe configuration of the communication system, thereby effectively improving performance and flexibility of the system. In another aspect, although the uplink-downlink subframe configuration of the TDD system has been changed, because there is the intersection between the second uplink-downlink subframe configuration and the first uplink-downlink subframe configuration, the UE having not obtained the adjusted second uplink-downlink subframe configuration in real-time can use the subframe type and timing relationship corresponding to the first uplink-downlink subframe configuration obtained before. Therefore, the base station can communicate with the UE by using the subframes in the intersection according to the timing relationship corresponding to the first uplink-downlink subframe configuration. The UE may not know that the uplink-downlink subframe configuration has been adjusted, and the adjustment on the uplink-downlink subframe configuration will not affect the data transmission between the UE and the base station, that is, the second uplink-downlink subframe configuration is transparent to the UE, which effectively ensures normal communication between the UE and the base station.

BRIEF DESCRIPTION OF THE DRAWINGS

In order to illustrate the technical solutions in embodiments of the present invention more clearly, accompanying drawings needed in the embodiments are illustrated briefly below. It is evident that the accompanying drawings only illustrate some embodiments of the present invention, and persons of ordinary skill in the art may derive other drawings according to the accompanying drawings without creative efforts.

DETAILED DESCRIPTION

The technical solutions in embodiments of the present invention are clearly and completely described in the following with reference to the accompanying drawings in the embodiments of the present invention.

It should be clearly known that the embodiments to be described are only a part rather than the entire of the embodiments of the present invention. Based on the embodiments of the present invention, all other embodiments derived by persons of ordinary skill in the art without creative efforts shall fall within the protection scope of the present invention.

In embodiments of the present invention, the base station may be an evolved Node B (evolved Node B, eNB), Node B, an access point (Access Point), and the like. Each base station may provide communication coverage for a specific geographic area. The term "cell" can be a coverage area of a base station and/or a coverage area served by the subsystem of the base station, depending on the context of the term. The base station can provide communication coverage for a macro cell, a pico cell (Pico Cell), a femto cell (Femto Cell), and/or other type of cells.

In embodiments of the present invention, UEs can be distributed in the entire wireless network; each UE may be either static or mobile. The UE can also be referred to as a terminal (Terminal), a mobile station (Mobile Station, MS), a subscriber unit (Subscriber Unit), or a station (Station). The UE may be a cellular phone (Cellular Phone), a personal digital assistant (Personal Digital Assistant, PDA), a wireless modem (Modem), a wireless communication device, a handheld device (Handheld), a laptop computer (Laptop computer), a cordless phone (Cordless Phone), a wireless local loop (Wireless Local Loop, WLL) station, and the like. The UE can communicate with the macro base station, the pico base station, the femto base station, or the like.

To help those skilled in the art better understand the technical solutions of the present invention, an uplink-downlink subframe configuration and a timing relationship in an LTE TDD system are illustrated briefly first.

Table 1 shows a specific uplink-downlink subframe configuration of an LTE TDD system, where the LTE TDD system supports seven different uplink-downlink subframe configurations, that is, configuration 0 to configuration 6. Each uplink-downlink subframe configuration corresponds to a type of radio frame configuration. Each radio frame includes ten subframes indexed with 0 to 9 (also referred to as subframe number), i.e., one type of uplink-downlink subframe configuration corresponds to ten subframes indexed from 0 to 9. Each subframe has a corresponding subframe type, which may be an uplink subframe, a downlink subframe or a special subframe. For example, in the uplink-downlink subframe configuration of the LTE TDD system shown in Table 1, D indicates that the subframe is a downlink subframe; S indicates that the subframe is a special subframe, and U indicates that the subframe is an uplink subframe. The downlink subframe applies to the downlink transmission only, the uplink subframe applies to the uplink transmission only, and the special subframe consists of three parts, that is, a downlink pilot time slot DwPTS (Downlink Pilot Time Slot), a guard period GP (Guard period) and an uplink pilot time slot UpPTS (Uplink Pilot Time Slot). The DwPTS is used for downlink transmission; the GP is a guard interval between downlink transmission and uplink transmission; and the UpPTS is used for uplink transmission.

TABLE 1

Uplink-downlink subframe configuration of the LTE TDD system

| Uplink-downlink Subframe Configuration | Subframe Index (Subframe Number) | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In an LTE TDD system, the base station schedules the UEs through a physical downlink control channel PDCCH (Physical Downlink Control Channel). The PDCCH can be a downlink grant DL grant for downlink scheduling grant or an uplink grant UL grant for uplink scheduling grant. The PDCCH carries scheduling information, such as time-frequency resource allocation, indicating a physical downlink shared channel PDSCH (physical downlink shared channel) or a physical uplink shared channel PUSCH (physical uplink shared channel). After receiving and decoding the PDCCH, the UE receives the downlink data carried on the PDSCH or sends the uplink data carried on the PUSCH according to the scheduling information carried on the PDCCH; and the UE sends a feedback acknowledge ACK (ACKnowledge)/non acknowledge NACK (Non ACKnowledge) in the uplink, where feedbacking the ACK indicates that the PDSCH is received successfully, and feedbacking the NACK indicates that the PDSCH fails to be received. Similarly, after receiving the uplink data, the base station sends an ACK/NACK feedback on the uplink data in the downlink. In addition, when the system supports retransmission of the UE, if a NACK is fed back in an uplink ACK/NACK feedback or a downlink ACK/NACK feedback, retransmission will be conducted by the base station or the UE.

In an LTE TDD system, a timing relationship (i.e., the timing relationship corresponding to an uplink-downlink subframe configuration) exists between the subframes in each type of uplink-downlink subframe configuration. These timing relationships include: a timing relationship between transmission time (or subframe) of UL grant for scheduling PUSCH transmission and PUSCH transmission time, a timing relationship between the PUSCH transmission time and downlink ACK/NACK feedback time, a timing relationship between PUSCH initial transmission time and PUSCH retransmission time, or a timing relationship between downlink PDSCH transmission time and uplink ACK/NACK feedback time. The base station and UE shall schedule, send, receive, feed back or retransmit data, by basing on the timing relationship corresponding to the uplink-downlink subframe configuration.

It can be clearly seen that each type of uplink-downlink subframe configuration in the LTE TDD system not only indicates the subframe type of each radio frame in the uplink-downlink subframe configuration, but also indicates the timing relationship corresponding to the uplink-downlink subframe configuration, including the timing relationship between PUSCH and UL grant scheduling, between PUSCH initial transmission and PUSCH retransmission, between PUSCH transmission and downlink ACK/NACK response, between PDSCH transmission and uplink ACK/NACK response, or the like.

Figure 1:
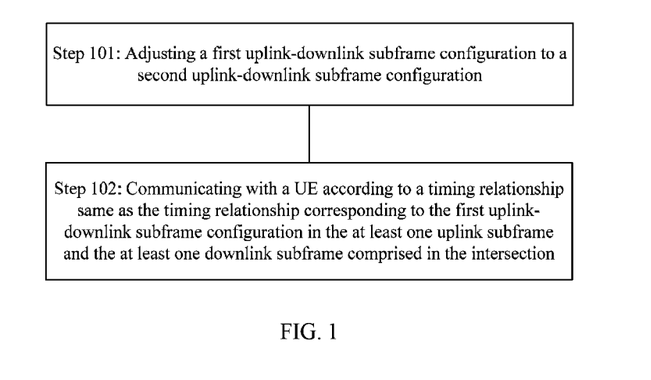
FIG. 1 is a flowchart of a communication method used for TDD according to an embodiment of the present invention.

As shown in FIG. 1, basing on a base station, an embodiment of the present invention provides a communication method used for a TDD system, including:

Step 101: Adjusting a first uplink-downlink subframe configuration to a second uplink-downlink subframe configuration.

In a practical communication system, uplink services and downlink services are not symmetric, and a service load of the system changes in time. For example, at a specific time, uplink load may increase greatly when users are uploading a large number of services; and at another moment, downlink load may increase greatly when users are downloading a large number of services.

To satisfy the needs such as the service load, in the embodiment of the present invention, the base station can dynamically adjust the uplink-downlink subframe configuration currently used in the system, by basing on the variations such as the service load at any time, that is, adjust the original first uplink-downlink subframe configuration to a second uplink-downlink subframe configuration. For example, the base station can increase the number of uplink subframes in the radio frames, by basing on the variation of the service load, when the uplink traffic which is the uplink load increases, that is, adjust the subframe types of the uplink-downlink subframe configuration. Likewise, the base station can increase the number of downlink subframes in the radio frames when the downlink traffic which is the downlink load increases, that is, adjust the subframe types of the uplink-downlink subframe configuration. In addition to adjusting the subframe types, the base station can also adjust the timing relationship of the uplink-downlink subframe configuration.

It should be noted that the dynamic adjustment of the uplink-downlink subframe configuration in the embodiment of the present invention is independent from the semi-static adjustment of the uplink-downlink subframe configuration through a system message without affecting each other.

In a communication system, if a UE determines an uplink-downlink subframe configuration of the system only according to a system message, when the uplink-downlink subframe configuration is adjusted by a base station and the adjusted uplink-downlink subframe configuration is different from the uplink-downlink subframe configuration set by the system message, the UE cannot know, in real-time, the uplink-downlink subframe configuration adjusted by the base station.

To ensure that the UE can communicate with the base station normally, basing on the first uplink-downlink subframe configuration set by the system message, the base station can determine the adjusted second uplink-downlink subframe configuration.

In the embodiment of the present invention, the first uplink-downlink subframe configuration may be the uplink-downlink subframe configuration set by the system message; subframe types and timing relationships corresponding to a second uplink-downlink subframe configuration may be different from at least one of subframe types and timing relationships corresponding to the first uplink-downlink subframe configuration; there may be an intersection between subframes corresponding to the second uplink-downlink subframe configuration and subframes corresponding to the first uplink-downlink subframe configuration, where the intersection is a set of subframes with the same subframe index and the same subframe type in the subframes corresponding to the first uplink-downlink subframe configuration and the subframes corresponding to the second uplink-downlink subframe configuration. The intersection includes at least one uplink subframe and at least one downlink subframe.

The second uplink-downlink subframe configuration may be one of the uplink-downlink subframe configurations shown in Table 1, or an uplink-downlink subframe configuration different from the uplink-downlink subframe configurations shown in Table 1.

Alternatively, in the embodiment in the present invention, the at least one uplink subframe included in the intersection includes an uplink subframe for PUSCH transmission, the at least one downlink subframe includes a downlink subframe for carrying a UL grant to schedule the PUSCH transmission, and a timing relationship between the uplink subframe for the PUSCH transmission and the downlink subframe for carrying the UL grant is the same as the timing relationship corresponding to the first uplink-downlink subframe configuration. This effectively ensures that a PUSCH can be scheduled and transmitted between the base station and the UE normally. For example, in the subframes corresponding to the first uplink-downlink subframe configuration, if the uplink subframe for PUSCH transmission is subframe n, and the downlink subframe for carrying the UL grant to schedule the PUSCH transmission is subframe n−k, the intersection includes the uplink subframe for the PUSCH transmission with the subframe index n, and the intersection includes a downlink subframe for carrying the UL grant to schedule the PUSCH transmission of the subframe n, where the subframe index of the downlink subframe is n−k.

Alternatively, the at least one uplink subframe included in the intersection includes an uplink subframe for PUSCH transmission, and the at least one downlink subframe includes a downlink subframe for sending an ACK/NACK feedback on the PUSCH transmission, where a timing relationship between the uplink subframe for the PUSCH transmission and the downlink subframe for sending the ACK/NACK feedback is the same as the timing relationship corresponding to the first uplink-downlink subframe configuration. This effectively ensures that a PUSCH can be transmitted between the base station and the UE normally. For example, in the subframes corresponding to the first uplink-downlink subframe configuration, if the subframe for the PUSCH transmission is subframe n, and the downlink subframe for sending the ACK/NACK feedback on the PUSCH transmission is subframe n+1, the intersection includes the uplink subframe for the PUSCH transmission with a subframe index n, and the intersection includes the downlink subframe for sending the ACK/NACK feedback on the PUSCH transmission of the subframe n, where the subframe index of the downlink subframe is n+1.

Alternatively, the at least one downlink subframe included in the intersection includes a downlink subframe for PDSCH transmission, and the at least one uplink subframe includes an uplink subframe for sending an ACK/NACK feedback on the PDSCH transmission, where a timing relationship between the downlink subframe for the PDSCH transmission and the uplink subframe for sending the ACK/NACK feedback is the same as the timing relationship corresponding to the first uplink-downlink subframe configuration. This effectively ensures that a PDSCH can be transmitted between the base station and the UE normally. For example, in the subframes corresponding to the first uplink-downlink subframe configuration, if the downlink subframe for the PDSCH transmission is n, and the uplink subframe for sending the ACK/NACK feedback on the PUSCH transmission is subframe n+p, the intersection includes the downlink subframe for the PDSCH transmission with a subframe index n, and the intersection includes the uplink subframe for sending the ACK/NACK feedback on the PDSCH transmission of the subframe n, where the subframe index of uplink subframe is n+p.

Alternatively, the at least one uplink subframe included in the intersection includes an uplink subframe for PUSCH transmission, and the at least one uplink subframe further includes an uplink subframe for retransmitting the PUSCH transmission, where a timing relationship between the uplink subframe for the PUSCH transmission and the uplink subframe for retransmitting the PUSCH transmission is the same as the timing relationship corresponding to the first uplink-downlink subframe configuration. This effectively ensures that the PUSCH can be retransmitted between the base station and the UE normally. For example, in the subframes corresponding to the first uplink-downlink subframe configuration, if the uplink subframe for the PUSCH transmission is n, and the uplink subframe for retransmitting the PUSCH transmission is n+q, the intersection includes the uplink subframe for the PUSCH transmission with a subframe index n, and the intersection includes the uplink subframe for PUSCH retransmission of the subframe n, where the subframe index of the uplink subframe is n+q.

In the embodiment of the present invention, the n, k, l, p and q are integers. If subframe indexes of the subframes included in a radio frame are 0 to 9, n can be any integer from 0 to 9. If the value of n+1, n+p or n+q is larger than 9, transmission is conducted on the corresponding subframes included in a next radio frame. Likewise, if n−k is smaller than 0, transmission is conducted on the corresponding subframes included in a previous radio frame.

In addition, alternatively, the second uplink-downlink subframe configuration may be obtained by the base station according to the service load and the first uplink-downlink subframe configuration, or may be selected by the base station from an uplink-downlink subframe configuration set. The uplink-downlink subframe configuration set is pre-set or is obtained by the base station according to the service load and the first uplink-downlink subframe configuration.

Alternatively, the service load may be obtained by the base station from detection, or be reported from the UE to the base station, which is not limited in this embodiment.

It should also be noted that, when the base station adjusts uplink-downlink subframe configuration dynamically, the uplink-downlink subframe configuration currently used by the system may be the first uplink-downlink subframe configuration configured by the system message, or may be another uplink-downlink subframe configuration different from the first uplink-downlink subframe configuration.

Step 102: Communicating with a UE according to a timing relationship same as the timing relationship corresponding to the first uplink-downlink subframe configuration in the at least one uplink subframe and the at least one downlink subframe included in the intersection.

For example, when the base station communicates with the UE, in the at least one uplink subframe and the at least one downlink subframe included in the intersection, the UL grant for scheduling the PUSCH transmission is carried in the downlink subframe n−k, and the PUSCH transmission is conducted in the uplink subframe n, where a timing relationship between the uplink subframe n and the downlink subframe n−k is the same as the timing relationship corresponding to the first uplink-downlink subframe configuration. Or, the PUSCH transmission is conducted in the uplink subframe n, and the ACK/NACK feedback on the PUSCH transmission is transmitted in the downlink subframe n+1, where a timing relationship between the uplink subframe n and the downlink subframe n+1 is the same as the timing relationship corresponding to the first uplink-downlink subframe configuration. Or, the PDSCH transmission is conducted in the downlink subframe n, and the ACK/NACK feedback on the PDSCH transmission is transmitted in the uplink subframe n+p, where a timing relationship between the downlink subframe n and the uplink subframe n+p is the same as the timing relationship corresponding to the first uplink-downlink subframe configuration. Or, the PUSCH transmission is conducted in the uplink subframe n, and the PUSCH is retransmitted in the uplink subframe n+q, where a timing relationship between the uplink subframe n and the uplink subframe n+q is the same as the timing relationship corresponding to the first uplink-downlink subframe configuration.

In the embodiment of the present invention, because the intersection between the second uplink-downlink subframe configuration and the first uplink-downlink subframe configuration exists, the UE having not obtained, in real-time, the adjusted second uplink-downlink subframe configuration may use the subframe type and the timing relationship corresponding to the first uplink-downlink subframe configuration obtained by using a previous system message. Therefore, the base station can communicate with the UE according to the timing relationship corresponding to the first uplink-downlink subframe configuration by using the subframes in the intersection. The UE may not know that the uplink-downlink subframe configuration has been adjusted, and the adjustment on the uplink-downlink subframe configuration will not affect the data transmission between the UE and the base station. That is, the second uplink-downlink subframe configuration is transparent to the UE. This effectively ensures the normal communication between the UE and the base station.

In the embodiment of the present invention, for a UE capable of obtaining an adjusted second uplink-downlink subframe configuration in real-time, the UE can obtain subframe types of subframes corresponding to the second uplink-downlink subframe configuration and a timing relationship corresponding to the second uplink-downlink subframe configuration in real-time. Therefore, the base station can communicate with the UE capable of obtaining the adjusted second uplink-downlink subframe configuration in real-time by using the second uplink-downlink subframe configuration, thus the flexibility and performance of the communication system is improved.

Figure 2:
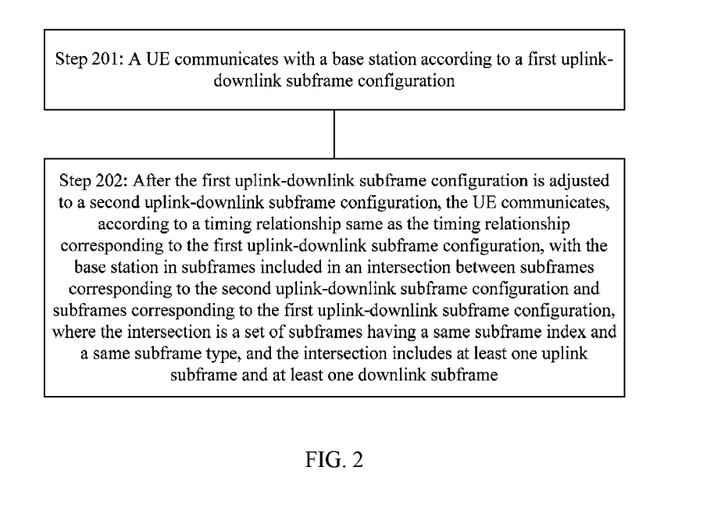
FIG. 2 is a flowchart of a communication method used for TDD according to an embodiment of the present invention.

As shown in FIG. 2, corresponding to the communication method shown in FIG. 1, basing on a UE, an embodiment of the present invention further provides another communication method used for a TDD system, including:

Step 201: A UE communicates with a base station according to a first uplink-downlink subframe configuration.

In the embodiment of the present invention, a first uplink-downlink subframe configuration may be an uplink-downlink subframe configuration set by a system message.

Step 202: After the first uplink-downlink subframe configuration is adjusted to a second uplink-downlink subframe configuration, the UE communicates, according to a timing relationship same as the timing relationship corresponding to the first uplink-downlink subframe configuration, with the base station in subframes included in an intersection between subframes corresponding to the second uplink-downlink subframe configuration and subframes corresponding to the first uplink-downlink subframe configuration, where the intersection is a set of subframes having a same subframe index and a same subframe type, and the intersection includes at least one uplink subframe and at least one downlink subframe.

Alternatively, in the embodiment in the present invention, the at least one uplink subframe included in the intersection includes an uplink subframe for PUSCH transmission, and the at least one downlink subframe includes a downlink subframe for carrying a UL grant to schedule the PUSCH transmission, where a timing relationship between the uplink subframe for the PUSCH transmission and the downlink subframe for carrying the UL grant is the same as the timing relationship corresponding to the first uplink-downlink subframe configuration. This effectively ensures that a PUSCH can be scheduled and transmitted between the base station and the UE normally.

Alternatively, the at least one uplink subframe included in the intersection includes an uplink subframe for PUSCH transmission, and the at least one downlink subframe includes a downlink subframe for sending an ACK/NACK feedback on the PUSCH transmission, where a timing relationship between the uplink subframe for the PUSCH transmission and the downlink subframe for sending the ACK/NACK feedback is the same as the timing relationship corresponding to the first uplink-downlink subframe configuration. This effectively ensures that a PUSCH can be transmitted between the base station and the UE normally.

Alternatively, the at least one downlink subframe included in the intersection includes a downlink subframe for PDSCH transmission, and the at least one uplink subframe includes an uplink subframe for sending an ACK/NACK feedback on the PDSCH transmission, where a timing relationship between the downlink subframe for the PDSCH transmission and the uplink subframe for sending the ACK/NACK feedback is the same as the timing relationship corresponding to the first uplink-downlink subframe configuration. This effectively ensures that a PDSCH can be transmitted between the base station and the UE normally.

Alternatively, the at least one uplink subframe included in the intersection includes an uplink subframe for PUSCH transmission, and the at least one uplink subframe further includes an uplink subframe for retransmitting the PUSCH transmission, where a timing relationship between the uplink subframe for the PUSCH transmission and the uplink subframe for retransmitting the PUSCH transmission is the same as the timing relationship corresponding to the first uplink-downlink subframe configuration. This effectively ensures that the PUSCH can be retransmitted between the base station and the UE normally In addition, the second uplink-downlink subframe configuration may be obtained by the base station according to service load and the first uplink-downlink subframe configuration, or may be selected by the base station from an uplink-downlink subframe configuration set. The uplink-downlink subframe configuration set is pre-set or is obtained by the base station according to the service load and the first uplink-downlink subframe configuration.

In the embodiment of the present invention, because the intersection between the second uplink-downlink subframe configuration and the first uplink-downlink subframe configuration exists, the UE having not obtained, in real-time, the adjusted second uplink-downlink subframe configuration can use the subframe type and the timing relationship corresponding to the first uplink-downlink subframe configuration obtained by using a previous system message. Therefore, the base station can communicate with the UE according to the timing relationship corresponding to the first uplink-downlink subframe configuration by using the subframes in the intersection. The UE may not know that the uplink-downlink subframe configuration has been adjusted, and the adjustment on the uplink-downlink subframe configuration will not affect the data transmission between the UE and the base station. That is, the second uplink-downlink subframe configuration is transparent to the UE. This effectively ensures the normal communication between the UE and the base station.

In the embodiment of the present invention, for a UE capable of obtaining an adjusted second uplink-downlink subframe configuration in real-time, the UE can obtain subframe types of subframes corresponding to the second uplink-downlink subframe configuration and a timing relationship corresponding to the second uplink-downlink subframe configuration in real-time. Therefore, the base station can communicate with the UE capable of obtaining the adjusted second uplink-downlink subframe configuration in real-time by using the second uplink-downlink subframe configuration, thus the flexibility and performance of the communication system is improved.

Figure 3:
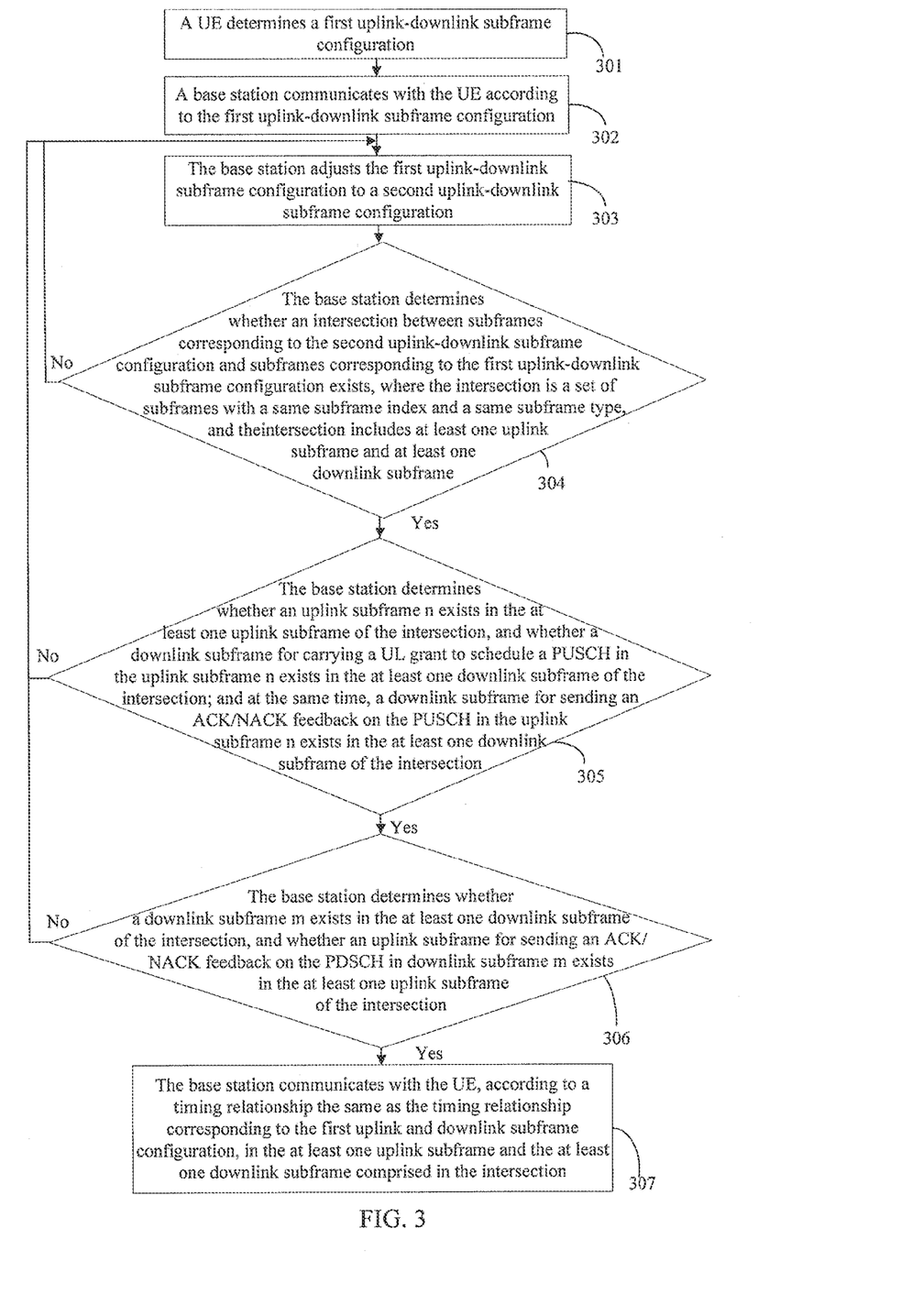
FIG. 3 is a flowchart of a communication method used for TDD according to an embodiment of the present invention.

Detailed description of a communication method used for a TDD system of the present invention is given as follows with reference to a specific embodiment. As shown in FIG. 3, the communication method used for a TDD system according to this embodiment, includes:

Step 301: A UE determines a first uplink-downlink subframe configuration.

Basing on a system message, the UE obtains the first uplink-downlink subframe configuration, thereby obtaining radio frames corresponding to the first uplink-downlink subframe configuration, that is, obtaining subframe type of the subframe corresponding to the first uplink-downlink subframe configuration and a timing relationship between the subframes.

Step 302: A base station communicates with the UE according to the first uplink-downlink subframe configuration.

Step 303: The base station adjusts the first uplink-downlink subframe configuration to a second uplink-downlink subframe configuration.

Specifically, the base station generates the second uplink-downlink subframe configuration, by basing on the service load and the first uplink-downlink subframe configuration set by the system message, and adjusts the first uplink-downlink subframe configuration to the second uplink-downlink subframe configuration.

In the embodiment of the present invention, the base station further determines the second uplink-downlink subframe configuration, by basing on a subframe configuration change principle. The subframe configuration change principle may includes at least one of a subframe type change principle and a timing relationship change principle, where the subframe type change principle specifies the subframes whose subframe types can be changed and how to change the subframe types, and the timing relationship change principle specifies the timing relationships which can be changed and how to change the timing relationships.

As seen from Table 1, in all the uplink-downlink subframe configurations of the LTE TDD system, subframes 0 and 5 are constantly the downlink subframes, subframe 1 is constantly a special subframe, subframe 6 can only be a special subframe or a downlink subframe, and subframe 2 is constantly an uplink subframe. Subframe 5 needs to carry a scheduling system message, subframes 0, 1, 5, and 6 need to carry scheduling paging messages. Therefore, when changing the uplink-downlink subframe configuration, the base station needs to keep the types of subframes 0 and 5, that is, subframes 0 and 5 can only be downlink subframes; meanwhile, in view of keeping consistency with the uplink-downlink subframe configurations of the LTE system, and at least one special subframe is required by the system for supporting the conversion from downlink subframe to uplink subframe (i.e., a previous subframe of a special subframe is constantly a downlink subframe, and a later subframe of the special subframe is constantly an uplink subframe), subframe 1 constantly serves as a special subframe, and correspondingly, subframe 2 constantly serves as an uplink subframe. For subframe 6, when subframe 6 is a special subframe, the base station can change the type of subframe 6 to a downlink subframe, at this time, because no conversion interval is set from the downlink to the uplink, all the uplink subframes within the subframes (subframes 7, 8, and 9) after subframe 6 can be configured to downlink subframes. In view of this, alternatively, in this embodiment, the subframe configuration change principle is as shown in Table 2.

Step 304: The base station determines whether an intersection between subframes corresponding to the second uplink-downlink subframe configuration and subframes corresponding to the first uplink-downlink subframe configuration exists, where the intersection is a set of subframes with the same subframe index and the same subframe type, and the intersection includes at least one uplink subframe and at least one downlink subframe.

If the intersection exists, step 305 is performed; otherwise, the process returns to step 303, and the base station re-generates another second uplink-downlink subframe configuration.

Step 305: The base station determines whether an uplink subframe n exists in the at least one uplink subframe of the intersection, and whether a downlink subframe for carrying a UL grant to schedule a PUSCH in the uplink subframe n exists in the at least one downlink subframe of the intersection; and at the same time, the base station determines whether a downlink subframe for sending an ACK/NACK feedback on the PUSCH in the uplink subframe n exists in the at least one downlink subframe of the intersection, where n is the subframe index.

If the TDD system is configured to support PUSCH retransmission, in this step, the base station determines whether an uplink subframe for retransmitting the PUSCH in the uplink subframe n exists in the at least one uplink subframe of the intersection.

If the uplink subframe n, the downlink subframe for carrying the UL grant and the downlink subframe for sending the ACK/NACK feedback exist, step 306 is performed; otherwise, the process returns to step 303, and the base station re-generates another second uplink-downlink subframe configuration.

TABLE 2

| Subframe Index Number | whether the subframe type can be changed dynamically |
|---|---|
| 0 | No, the type can only be the downlink subframe; |
| 1 | No, the type can only be the special subframe; |
| 2 | No, the type can only be the uplink subframe; |
| 3 | Yes, the type can be either the uplink subframe or the downlink subframe; |
| 4 | Yes, the type can be either the uplink subframe or the downlink subframe; |
| 5 | No, the type can only be the downlink subframe; |

TABLE 2-continued

| Subframe Index Number | whether the subframe type can be changed dynamically |
|---|---|
| 6 | Yes, the type can be either the special subframe or the downlink subframe; |
| 7 | Yes, the type can be either the uplink subframe or the downlink subframe; |
| 8 | Yes, the type can be either the uplink subframe or the downlink subframe; |
| 9 | Yes, the type can be either the uplink subframe or the downlink subframe; |

Step 306: The base station determines whether a downlink subframe m exists in the at least one downlink subframe of the intersection, and whether an uplink subframe for sending an ACK/NACK feedback on the PDSCH in downlink subframe m exists in the at least one uplink subframe of the intersection, where m is the subframe index.

If the downlink subframe m and the uplink subframe for sending the ACK/NACK feedback exist, step 307 is performed; otherwise, the process returns to step 303 to re-generate another second uplink-downlink subframe configuration.

Step 307: The base station communicates with the UE, according to a timing relationship same as the timing relationship corresponding to the first uplink-downlink subframe configuration, in the at least one uplink subframe and the at least one downlink subframe included in the intersection.

In the embodiment of the present invention, for a UE capable of obtaining the second uplink-downlink subframe configuration in real-time, the base station can communicate with the UE according to the subframe type and the timing relationship defined by the second uplink-downlink subframe configuration.

Assuredly, a service load of the system is not fixed. Alternatively, after step 307 in this embodiment is performed, the base station can dynamically adjust the uplink-downlink subframe configuration once more or multiple times, by basing on variation of the service load.

Figure 4:
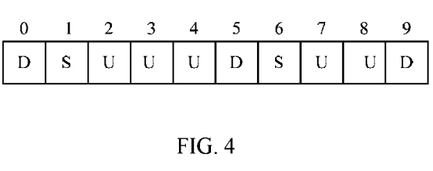
FIG. 4 is a schematic diagram of a second uplink-downlink subframe configuration determined in the communication method illustrated in FIG. 3.

Detailed description of the communication method used for a TDD system of this embodiment is given as follows with reference to specific examples. It is assumed that a system message (such as a system information block 1 (System Information Block 1, SIB1) indicates a TDD subframe configuration, that is, the first uplink-downlink subframe configuration is uplink-downlink subframe configuration 0, where for details about the uplink-downlink subframe configuration 0, reference may be made to Table 1. In step 303, the base station adjusts, by basing on the service load, the uplink-downlink subframe configuration 0 and a subframe configuration change principle (as shown in Table 2), a subframe type of uplink subframe 9 in the uplink-downlink subframe configuration 0 to a downlink subframe, and generates a second uplink-downlink subframe configuration X, where the second uplink-downlink subframe configuration X is shown in FIG. 4. In step 304, the base station determines that an intersection between subframes determined by the subframe types corresponding to the generated second uplink-downlink subframe configuration X and subframes determined by the subframe types corresponding to the first uplink-downlink subframe configuration 0 exists, where the intersection includes at least one uplink subframe and at least one downlink subframe. The intersection is a set of subframes having the same subframe index and the same subframe type in the subframes corresponding to the first uplink-downlink subframe configuration and the subframes corresponding to the second uplink-downlink subframe configuration. Specifically, it can be seen from Table 1 and FIG. 4, in the subframes corresponding to the uplink-downlink subframe configuration 0, subframes with subframe indexes 0 and 5 are downlink subframes, subframes with subframe indexes 1 and 6 are special subframes, and subframes with subframe indexes 2, 3, 4, 7, 8 and 9 are uplink subframes. In the subframes corresponding to the second uplink-downlink subframe configuration shown in FIG. 4, subframes with subframe indexes 0, 5 and 9 are downlink subframes, subframes with subframe indexes 1 and 6 are special subframes, and subframes with subframe indexes 2, 3, 4, 7 and 8 are uplink subframes. Therefore, in the subframes corresponding to uplink-downlink subframe configuration 0 and the subframes corresponding to the second uplink-downlink subframe configuration shown in FIG. 4, the subframes having the same subframe index and the same subframe type are these nine subframes indexed from 0 to 8. Therefore, in the embodiment, an intersection A between the second uplink-downlink subframe configuration X and the first uplink-downlink subframe configuration is:

{D(0), S(1), U(2), U(3), U(4), D(5), S(6), U(7), U(8)}

In step 305, the base station determines that uplink subframes 2, 7 and 8 exist in the intersection A, and according to a timing relationship of the uplink-downlink subframe configuration 0, downlink subframes for carrying a UL grant to schedule PUSCHs of the uplink subframes 2, 7 and 8 exist in the intersection A, and downlink subframes for sending the ACK/NACK feedback on the PUSCHs of the uplink subframes 2, 7 and 8 exist in the intersection A. In step 306, the base station determines that downlink subframes 0, 1 and 6 exist in the intersection A, and according to a timing relationship of the uplink-downlink subframe configuration 0, uplink subframes for sending the ACK/NACK feedback on PDSCHs of the downlink subframes 0, 1 and 6 exist in the intersection A. In step 307, the base station can communicate, according to a timing relationship the same as the timing relationship corresponding to the uplink-downlink subframe configuration 0, in the subframes included in the intersection A, with a UE having not obtained the second uplink-downlink subframe configuration in real-time. In addition, the base station may also communicate, by using the second uplink-downlink subframe configuration X, with a UE capable of obtaining the second uplink-downlink subframe configuration in real-time.

It should be noted that, in this embodiment, the second uplink-downlink subframe configuration is obtained by the base station according to service load and the first uplink-downlink subframe configuration, which is, however, not limited thereto in this embodiment. An uplink-downlink subframe configuration set may be pre-set, which includes several uplink-downlink subframe configurations satisfying conditions of the second uplink-downlink configuration; if there is a need to adjust uplink-downlink subframe configuration, the base station can make a selection from the uplink-downlink subframe configuration set directly to obtain a second uplink-downlink subframe configuration, or the base station may obtain an uplink-downlink subframe configuration set which includes several uplink-downlink subframe configurations satisfying conditions of the second uplink-downlink configuration, according to service load and the first uplink-downlink subframe configuration in advance or as needed, and make a selection from the set to obtain a second uplink-downlink subframe configuration.

Figure 5:
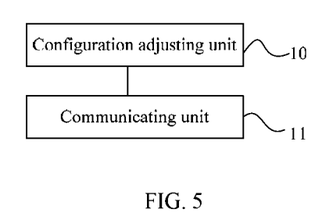
FIG. 5 is a structural block diagram of a base station according to an embodiment of the present invention.

Corresponding to the above communication method, an embodiment of the present invention further provides a base station. The base station provided by the embodiment of the present invention can be applied to the method embodiment of the present invention, and as shown in FIG. 5, the base station includes:

a configuration adjusting unit 10, configured to adjust a first uplink-downlink subframe configuration to a second uplink-downlink subframe configuration, where there is an intersection between subframes corresponding to the second uplink-downlink subframe configuration and subframes corresponding to the first uplink-downlink subframe configuration, the intersection is a set of subframes having a same subframe index and a same subframe type, and the intersection includes at least one uplink subframe and at least one downlink subframe; and a communicating unit 11, configured to communicate with a UE, according to a timing relationship same as a timing relationship corresponding to the first uplink-downlink subframe configuration, in the at least one uplink subframe and the at least one downlink subframe included in the intersection.

For details about the method for adjusting the second uplink-downlink subframe configuration by the configuration adjusting unit 10 of the base station, and the method for communicating by the communicating unit 11 with the UE in the embodiment of the present invention, reference may be made to the method for adjusting the second uplink-downlink subframe configuration by the base station, and the method for communicating by the base station with the UE in the method embodiment of the present invention. In the base station embodiment of the present invention, the first uplink-downlink subframe configuration and the second uplink-downlink subframe configuration may be the same as the first uplink-downlink subframe configuration and the second uplink-downlink subframe configuration in the method embodiment of the present invention.

According to the base station provided in the embodiment of the present invention, because the intersection between the second uplink-downlink subframe configuration and the first uplink-downlink subframe configuration exists, the UE having not obtained the adjusted second uplink-downlink subframe configuration in real-time can use the subframe type and the timing relationship corresponding to the first uplink-downlink subframe configuration obtained by using a previous system message. Therefore, the base station can communicate with the UE according to the timing relationship corresponding to the first uplink-downlink subframe configuration by using the subframes in the intersection. The UE may not know that the uplink-downlink subframe configuration has been adjusted, and the adjustment on the uplink-downlink subframe configuration will not affect the data transmission between the UE and the base station. That is, the second uplink-downlink subframe configuration is transparent to the UE. This effectively ensures normal communication between the UE and the base station.

In addition, a UE capable of obtaining the adjusted second uplink-downlink subframe configuration in real-time can obtain subframe types of the subframes corresponding to the second uplink-downlink subframe configuration and a timing relationship corresponding to the second uplink-downlink subframe configuration in real-time. The base station provided in the embodiment of the present invention can communicate with the UE, which is capable of obtaining the adjusted second uplink-downlink subframe configuration in real-time, by using the second uplink-downlink subframe configuration, thereby improving the flexibility and performance of the communication system.

Alternatively, in the intersection between the subframes corresponding to the second uplink-downlink subframe configuration adjusted by the configuration adjusting unit 10 and the subframes corresponding to the first uplink-downlink subframe configuration:

the at least one uplink subframe includes an uplink subframe for PUSCH transmission, and the at least one downlink subframe includes a downlink subframe for carrying a UL grant to schedule the PUSCH transmission, where a timing relationship between the uplink subframe for the PUSCH transmission and the downlink subframe for carrying the UL grant is the same as the timing relationship corresponding to the first uplink-downlink subframe configuration; or, the at least one uplink subframe includes an uplink subframe for PUSCH transmission, and the at least one downlink subframe includes a downlink subframe for sending an ACK/NACK feedback on the PUSCH transmission, where a timing relationship between the uplink subframe for the PUSCH transmission and the downlink subframe for sending the ACK/NACK feedback is the same as the timing relationship corresponding to the first uplink-downlink subframe configuration; or, the at least one downlink subframe includes a downlink subframe for PDSCH transmission, and the at least one uplink subframe includes an uplink subframe for sending an ACK/NACK feedback on the PDSCH transmission, where a timing relationship between the downlink subframe for the PDSCH transmission and the uplink subframe for sending the ACK/NACK feedback is the same as the timing relationship corresponding to the first uplink-downlink subframe configuration; or, the at least one uplink subframe includes an uplink subframe for PUSCH transmission, and the at least one uplink subframe further includes an uplink subframe for retransmitting the PUSCH transmission, where a timing relationship between the uplink subframe for the PUSCH transmission and the uplink subframe for retransmitting the PUSCH transmission is the same as the timing relationship corresponding to the first uplink-downlink subframe configuration.

In addition, the configuration adjusting unit 10 is specifically configured to obtain the second uplink-downlink subframe configuration according to service load and the first uplink-downlink subframe configuration, or make a selection from an uplink-downlink subframe configuration set to obtain the second uplink-downlink subframe configuration, where the uplink-downlink subframe configuration set is pre-set or is obtained by the configuration adjusting unit 10 according to service load and the first uplink-downlink subframe configuration.

Figure 6:
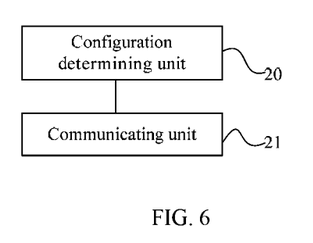
FIG. 6 is a structural block diagram of a user equipment according to an embodiment of the present invention.

Correspondingly, an embodiment of the present invention further provides a UE. The UE can be applied to the method embodiment provided in the present invention, and as shown in FIG. 6, the UE includes:

a configuration determining unit 20, configured to obtain a first uplink-downlink subframe configuration; and a communicating unit 21, configured to communicate, after the first uplink-downlink subframe configuration is adjusted to a second uplink-downlink subframe configuration, communicate, according to a timing relationship same as the timing relationship corresponding to the first uplink-downlink subframe configuration, with the base station in subframes included in an existing intersection between subframes corresponding to the second uplink-downlink subframe configuration and subframes corresponding to the first uplink-downlink subframe configuration, where the intersection is a set of subframes having a same subframe index and a same subframe type, and the intersection includes at least one uplink subframe and at least one downlink subframe.

In the embodiment of the present invention for providing a UE, the first uplink-downlink subframe configuration and the second uplink-downlink subframe configuration can be the same as the first uplink-downlink subframe configuration and the second uplink-downlink subframe configuration in the method embodiment of the present invention.

According to the UE provided in the embodiment of the present invention, because the intersection between the second uplink-downlink subframe configuration and the first uplink-downlink subframe configuration exists, the UE having not obtained the adjusted second uplink-downlink subframe configuration in real-time can use the subframe type and the timing relationship corresponding to the first uplink-downlink subframe configuration obtained by using a previous system message. Therefore, the base station can communicate with the UE according to the timing relationship corresponding to the first uplink-downlink subframe configuration by using the subframes in the intersection. The UE may not know that the uplink-downlink subframe configuration has been adjusted, and the adjustment on the uplink-downlink subframe configuration will not affect the data transmission between the UE and the base station. That is, the second uplink-downlink subframe configuration is transparent to the UE. This effectively ensures normal communication between the UE and the base station.

Alternatively, in the intersection, which is used by the communicating unit 21 for communicating with the base station, of the subframes corresponding to the second uplink-downlink subframe configuration and the subframes corresponding to the first uplink-downlink subframe configuration:

the at least one uplink subframe includes an uplink subframe for PUSCH transmission, and the at least one downlink subframe includes a downlink subframe for carrying a UL grant to schedule the PUSCH transmission, where a timing relationship between the uplink subframe for the PUSCH transmission and the downlink subframe for carrying the UL grant is the same as the timing relationship corresponding to the first uplink-downlink subframe configuration; or, the at least one uplink subframe includes an uplink subframe for PUSCH transmission, and the at least one downlink subframe includes a downlink subframe for sending an ACK/NACK feedback on the PUSCH transmission, where a timing relationship between the uplink subframe for the PUSCH transmission and the downlink subframe for sending the ACK/NACK feedback is the same as the timing relationship corresponding to the first uplink-downlink subframe configuration; or, the at least one downlink subframe includes a downlink subframe for PDSCH transmission, and the at least one uplink subframe includes an uplink subframe for sending an ACK/NACK feedback on the PDSCH transmission, where a timing relationship between the downlink subframe for the PDSCH transmission and the uplink subframe for sending the ACK/NACK feedback is the same as the timing relationship corresponding to the first uplink-downlink subframe configuration; or, the at least one uplink subframe includes an uplink subframe for PUSCH transmission, and the at least one uplink subframe further includes an uplink subframe for retransmitting the PUSCH transmission, where a timing relationship between the uplink subframe for the PUSCH transmission and the uplink subframe for retransmitting the PUSCH transmission is the same as the timing relationship corresponding to the first uplink-downlink subframe configuration.

Alternatively, the second uplink-downlink subframe configuration can be obtained by the base station according to service load and the first uplink-downlink subframe configuration; or can be selected by the base station from an uplink-downlink subframe configuration set; where the uplink-downlink subframe configuration set is pre-set or is obtained by the base station according to service load and the first uplink-downlink subframe configuration.

Those skilled in the art would understand that information and data in embodiments of the present invention may be represented using any of a variety of technologies and techniques. For example, data (Data), instructions (Instructions), commands (Command), information (Information), signals (Signal), bits (Bit), symbols (Symbol), and chips (Chip) may be represented by voltages, currents, electromagnetic waves, magnetic fields or magnetic particles, optical fields or particles, or any combination thereof.

Those skilled in the art would further know that the various illustrative logical blocks (Illustrative Logical block), units, and steps described by embodiments of the present invention may be implemented by an electronic hardware, a computer software, or a combination thereof. To clearly illustrate interchangeability (Interchangeability) between the hardware and the software, various illustrative components (Illustrative Components), units and steps have been described above generally in terms of their functionality. Whether such functionality is implemented as hardware or software depends upon specific applications and design requirements of the entire system. Those skilled in the art may implement the described functionality in various ways for each specific application. Such implementation modes, however, should not be interpreted as a departure from the scope of the present disclosure.

The various illustrative logical blocks, or units described in embodiments of the present invention may be implemented within or operated by a general processor, a digital signal processor, an application specific integrated circuit (ASIC), a field programmable gate array (FPGA) or other programmable logic devices, a discrete gate or a transistor logic, a discrete hardware component, or any combination thereof designed to perform the functions described herein. A general processor may be a microprocessor, and alternatively, the general processor may be any conventional processor, controller, microcontroller, or state machine. A processor may also be implemented by a combination of computing devices, e.g., a combination of a digital signal processor and a microprocessor, a plurality of microprocessors, one or more microprocessors in combination with a digital signal processor core, or any other such configuration.

Steps of a method or algorithm described in embodiments of the present invention may be embodied directly in hardware, in a software module executed by a processor, or in a combination thereof. The software module may reside in a storage medium such as a RAM, a flash memory, ROM, an EPROM, an EEPROM, a register, a hard disk, a removable disk, a CD-ROM, or any other form of storage medium known in the art. Exemplarily, the storage medium may be connected to a processor such that the processor can read information from and write information to the storage medium. Alternatively, the storage medium may be integrated into the processor. The processor and the storage medium may be set in an ASIC. The ASIC may be set in a user terminal. Alternatively, the processor and the storage medium may be set in different components in the user terminal.

In one or more illustrative designs, the functions described in embodiments of the present invention can be implemented in hardware, software, firmware, or any combination thereof. If the functions are implemented in software, these functions can be stored in a computer-readable medium, or transmitted to a computer-readable medium in form of one or more instructions or code. The computer-readable medium includes a computer storage medium and a communication medium facilitating transfer of a computer program from one place to another. The storage medium may be an available medium accessible for any general computer or special computer. For example, such computer-readable medium may include, but not limited to, a RAM, a ROM, an EEPROM, a CD-ROM or other optical disk storage devices, a magnetic disk storage or other magnetic storage devices, or any other device for carrying or storing instructions or data structures, as well as other program code media where program code can be read by a general or special computer, or a general or special processor. In addition, any connection can be suitably defined as a computer-readable medium, for example, a software can also be included in the definition of computer-readable medium if it is transmitted from a website, server, or other remote resources via a coaxial cable, fiber-optic computer, twisted pair, digital subscriber line (DSL) or wireless transmission such as infrared, radio and microwave. The disk (Disk) and disc (Disc) include a compressed disk, a laser disk, a CD-ROM, a DVD, a floppy disk and a blue-ray disc, where the disks usually duplicate data magnetically, while the discs usually duplicate data optically by a laser. The above-mentioned combination can also be included in a computer-readable medium.

The previous description of the disclosed aspects is provided to enable any person skilled in the art to make or use the present disclosure. Various modifications made to these aspects will be readily apparent to those skilled in the art, and the generic principles defined herein may be applied to other variants without departing from the essence and scope of the disclosure. Thus, the disclosure in the present invention is not merely limited to the described embodiments and designs, and may be extended to a maximum scope defined by the principles and disclosed features in the present invention.

What is claimed is:

1. A communication method used for a time division duplex system, the method comprising:
   adjusting, by a base station, a first uplink-downlink subframe configuration to a second uplink-downlink subframe configuration, wherein an intersection comprises a set of subframes having at least one uplink subframe and at least one downlink subframe, and each of the subframes has a same subframe index and type between at least one subframe configured by the first uplink-downlink subframe configuration and at least one subframe configured by the second uplink-downlink subframe configuration, wherein the second uplink-downlink subframe configuration is selected from an uplink-downlink subframe configuration set, and wherein the uplink-downlink subframe configuration set is pre-set or is obtained according to service load and the first uplink-downlink subframe configuration;
   communicating, by the base station, with a user equipment according to a timing relationship in the at least one uplink subframe and the at least one downlink subframe, wherein the timing relationship of the communication is the same as that of the first uplink-downlink subframe configuration, and wherein the timing relationship of the first uplink-downlink subframes configuration is a timing relationship existing between subframes in the first uplink-downlink subframe configuration;
   wherein before the adjusting, the method further comprising:
   selecting, by the base station, the second uplink-downlink subframe configuration from the uplink-downlink subframe configuration set, or obtaining, by the base station, the second uplink-downlink subframe configuration according to the service load and the first uplink-downlink subframe configuration;
   determining, by the base station, whether the second uplink-downlink subframe configuration and the first uplink-downlink subframe configuration have the intersection, and determining, by the base station, whether the intersection comprises subframes providing the timing relationship of the first uplink-downlink subframes configuration; and
   when the second uplink-downlink subframe configuration and the first uplink-downlink subframe configuration do not have the intersection, or when the intersection does not comprise the subframes providing the timing relationship of the first uplink-downlink subframes configuration, selecting, by the base station, another uplink-downlink subframe configuration from the uplink-downlink subframe configuration set, or obtaining, by the base station, another uplink-downlink subframe configuration according to service load and the first uplink-downlink subframe configuration.

2. The communication method according to claim 1, wherein,
   the at least one uplink subframe comprises an uplink subframe for physical uplink shared channel (PUSCH) transmission, and the at least one downlink subframe comprises a downlink subframe for carrying an uplink grant (UL grant) to schedule the PUSCH transmission, wherein a timing relationship between the uplink subframe for the PUSCH transmission and the downlink subframe for carrying the UL grant is the same as the timing relationship corresponding to the first uplink-downlink subframe configuration.

3. The communication method according to claim 1, wherein, the at least one uplink subframe comprises an uplink subframe for physical uplink shared channel (PUSCH) transmission, and the at least one downlink subframe comprises a downlink subframe for sending an acknowledge/non acknowledge (ACK/NACK) feedback on the PUSCH transmission, wherein a timing relationship between the uplink subframe for the PUSCH transmission and the downlink subframe for sending the ACK/NACK feedback is the same as the timing relationship corresponding to the first uplink-downlink subframe configuration.

4. The communication method according to claim 1, wherein, the at least one downlink subframe comprises a downlink subframe for physical uplink shared channel (PDSCH) transmission, and the at least one uplink subframe comprises an uplink subframe for sending an acknowledge/non acknowledge (ACK/NACK) feedback on the PDSCH transmission, wherein a timing relationship between the downlink subframe for the PDSCH transmission and the uplink subframe for sending the ACK/NACK feedback is the same as the timing relationship corresponding to the first uplink-downlink subframe configuration.

5. The communication method according to claim 1, wherein, the at least one uplink subframe comprises an uplink subframe for physical uplink shared channel (PUSCH) transmission, and the at least one uplink subframe further comprises an uplink subframe for retransmitting the PUSCH transmission, wherein a timing relationship between the uplink subframe for the PUSCH transmission and the uplink subframe for retransmitting the PUSCH transmission is the same as the timing relationship corresponding to the first uplink-downlink subframe configuration.

6. The communication method according to claim 1, wherein, the second uplink-downlink subframe configuration is obtained according to service load and the first uplink-downlink subframe configuration.

7. A base station, comprising:
a processor, configured to adjust a first uplink-downlink subframe configuration to a second uplink-downlink subframe configuration, wherein an intersection comprises at least one uplink subframe and at least one downlink subframe and each of the subframes has a same subframe index and type between at least one subframe configured by the first uplink-downlink subframe configuration and at least one subframe configured by the second uplink-downlink subframe configuration, wherein the second uplink-downlink subframe configuration is selected from an uplink-downlink subframe configuration set, and wherein the uplink-downlink subframe configuration set is pre-set or is obtained according to service load and the first uplink-downlink subframe configuration; and
a transceiver, configured to communicate with a user equipment, according to a timing relationship in the at least one uplink subframe and the at least one downlink subframe, wherein the timing relationship of the communication is the same as that of the first uplink-downlink subframe configuration, and wherein the timing relationship of the first uplink-downlink subframes configuration is a timing relationship existing between subframes in the first uplink-downlink subframe configuration,
wherein the processor is further configured to:
select the second uplink-downlink subframe configuration from the uplink-downlink subframe configuration set, or obtain the second uplink-downlink subframe configuration according to the service load and the first uplink-downlink subframe configuration,
determine whether the second uplink-downlink subframe configuration and the first uplink-downlink subframe configuration have the intersection, and determine whether the intersection comprises subframes providing the timing relationship of the first uplink-downlink subframes configuration, and
when the second uplink-downlink subframe configuration and the first uplink-downlink subframe configuration do not have the intersection, or when the intersection does not comprise the subframes providing the timing relationship of the first uplink-downlink subframes configuration, select another uplink-downlink subframe configuration from the uplink-downlink subframe configuration set, or obtain another uplink-downlink subframe configuration according to service load and the first uplink-downlink subframe configuration.

8. The base station according to claim 7, wherein in the intersection the at least one uplink subframe comprises an uplink subframe for physical uplink shared channel (PUSCH) transmission, and the at least one downlink subframe comprises a downlink subframe for carrying a uplink grant (UL grant) to schedule the PUSCH transmission, wherein a timing relationship between the uplink subframe for the PUSCH transmission and the downlink subframe for carrying the UL grant is the same as the timing relationship corresponding to the first uplink-downlink subframe configuration.

9. The base station according to claim 7, wherein in the intersection the at least one uplink subframe comprises an uplink subframe for physical uplink shared channel (PUSCH) transmission, and the at least one downlink subframe comprises a downlink subframe for sending an acknowledge/non acknowledge (ACK/NACK) feedback on the PUSCH transmission, wherein a timing relationship between the uplink subframe for the PUSCH transmission and the downlink subframe for sending the ACK/NACK feedback is the same as the timing relationship corresponding to the first uplink-downlink subframe configuration.

10. The base station according to claim 7, wherein in the intersection the at least one downlink subframe comprises a downlink subframe for physical uplink shared channel (PDSCH) transmission, and the at least one uplink subframe comprises an uplink subframe for sending an acknowledge/non acknowledge (ACK/NACK) feedback on the PDSCH transmission, wherein a timing relationship between the downlink subframe for the PDSCH transmission and the uplink subframe for sending the ACK/NACK feedback is the same as the timing relationship corresponding to the first uplink-downlink subframe configuration.

11. The base station according to claim 7, wherein in the intersection the at least one uplink subframe comprises an uplink subframe for physical uplink shared channel (PUSCH) transmission, and the at least one uplink subframe further comprises an uplink subframe for retransmitting the PUSCH transmission, wherein a timing relationship between the uplink subframe for the PUSCH transmission and the uplink subframe for retransmitting the PUSCH transmission is the same as the timing relationship corresponding to the first uplink-downlink subframe configuration.

12. The base station according to claim 7, wherein, the processor is specifically further configured to obtain the second uplink-downlink subframe configuration according to service load and the first uplink-downlink subframe configuration to be specific.

13. The base station according to claim 7, wherein, the processor is specifically further configured to make a selection from an uplink-downlink subframe configuration set to obtain the second uplink-downlink subframe configuration, wherein the uplink-downlink subframe configuration set is pre-set or is obtained according to the service load and the first uplink-downlink subframe configuration.

14. A user equipment, comprising:
a processor, configured to obtain a first uplink-downlink subframe configuration; and
a transceiver, configured to communicate with a base station, after the first uplink-downlink subframe configuration is adjusted to a second uplink-downlink subframe configuration by the base station according to a timing relationship in at least one uplink subframe and at least one downlink subframe, where the timing relationship is the same as that of the first uplink-downlink subframe configuration, and the timing relationship of the first uplink-downlink subframes configuration is a timing relationship existing between subframes in the first uplink-downlink subframe configuration, wherein the subframes providing the timing relationship comprise an intersection between subframes corresponding to the second uplink-downlink subframe configuration and subframes corresponding to the first uplink-downlink subframe configuration, wherein the second uplink-downlink subframe configuration is selected from an uplink-downlink subframe configuration set, and wherein the uplink-downlink subframe configuration set is pre-set or is obtained according to service load and the first uplink-downlink subframe configuration, wherein the intersection is a set of subframes having a same subframe index and a same subframe type, and the intersection comprises at least one uplink subframe and at least one downlink subframe, wherein the base station is further configured to:

select the second uplink-downlink subframe configuration from the uplink-downlink subframe configuration set, or obtain the second uplink-downlink subframe configuration according to the service load and the first uplink-downlink subframe configuration,     determine whether the second uplink-downlink subframe configuration and the first uplink-downlink subframe configuration have the intersection, and determine whether the intersection comprises subframes providing the timing relationship of the first uplink-downlink subframes configuration, and     when the second uplink-downlink subframe configuration and the first uplink-downlink subframe configuration do not have the intersection, or when the intersection does not comprise the subframes providing the timing relationship of the first uplink-downlink subframes configuration, select another uplink-downlink subframe configuration from the uplink-downlink subframe configuration set, or obtain another uplink-downlink subframe configuration according to service load and the first uplink-downlink subframe configuration.

15. The user equipment according to claim 14, wherein in the intersection the at least one uplink subframe comprises an uplink subframe for physical uplink shared channel (PUSCH) transmission, and the at least one downlink subframe comprises a downlink subframe for carrying an uplink grant (UL grant) to schedule the PUSCH transmission, wherein a timing relationship between the uplink subframe for the PUSCH transmission and the downlink subframe for carrying the UL grant is the same as the timing relationship corresponding to the first uplink-downlink subframe configuration.

16. The user equipment according to claim 14, wherein in the intersection the at least one uplink subframe comprises an uplink subframe for physical uplink shared channel (PUSCH) transmission, and the at least one downlink subframe comprises a downlink subframe for sending an acknowledge/non acknowledge (ACK/NACK) feedback on the PUSCH transmission, wherein a timing relationship between the uplink subframe for the PUSCH transmission and the downlink subframe for sending the ACK/NACK feedback is the same as the timing relationship corresponding to the first uplink-downlink subframe configuration.

17. The user equipment according to claim 14, wherein in the intersection the at least one downlink subframe comprises a downlink subframe for physical uplink shared channel (PDSCH) transmission, and the at least one uplink subframe comprises an uplink subframe for sending an acknowledge/non acknowledge (ACK/NACK) feedback on the PDSCH transmission, wherein a timing relationship between the downlink subframe for the PDSCH transmission and the uplink subframe for sending the ACK/NACK feedback is the same as the timing relationship corresponding to the first uplink-downlink subframe configuration.

18. The user equipment according to claim 14, wherein in the intersection the at least one uplink subframe comprises an uplink subframe for physical uplink shared channel (PUSCH) transmission, and the at least one uplink subframe further comprises an uplink subframe for retransmitting the PUSCH transmission, wherein a timing relationship between the uplink subframe for the PUSCH transmission and the uplink subframe for retransmitting the PUSCH transmission is the same as the timing relationship corresponding to the first uplink-downlink subframe configuration.

\* \* \* \* \*